United States Patent Office 3,288,728
Patented Nov. 29, 1966

3,288,728
PARA-XYLYLENE COPOLYMERS
William F. Gorham, Berkeley Heights, N.J., assignor to Union Carbide Corporation, a corporation of New York
No Drawing. Filed Feb. 18, 1966, Ser. No. 528,609
8 Claims. (Cl. 260—2)

This application is a continuation-in-part of my earlier application Serial No. 50,600, filed August 19, 1960, which is a continuation-in-part of my earlier application Serial No. 622,249, filed November 15, 1956, both now abandoned.

This invention relates to novel copolymers of substituted para xylylenes and to a method of producing same. More particularly, this invention relates to copolymers of substituted p-xylylenes made by pyrolyzing a substituted di-p-xylylene and condensing the diradicals formed by the pyrolysis.

It is known that various poly-p-xylylenes can be prepared by a pyrolytic polymerization of p-xylene and substituted derivatives thereof. This process, first disclosed by M. Szwarc (Disc. Faraday Society 2, 46 (1947)) and now conventionally termed the Szwarc process, basically consists of a high temperature pyrolysis (800–1000° C. at subatmospheric pressures) of the starting p-xylene followed by cooling the pyrolysis vapors to a polymerization temperature, such as by condensing the vapors on the cold surface. Upon cooling and condensation, the reactive diradical formed in the pyrolysis instantly polymerizes and forms a polymeric film on the cool surface. However, the high operating temperature of this process and the exceptionally low yield of polymer (about 10–12 percent of theoretical) left much to be desired for commercial applications.

For instance, in this process, operating temperatures of 800°–1000° C. were found to cleave off substituent groups on the para-xylene because of the instability at such temperatures of such substituent groups, as for example alkyl, halogens, acetyl, cyano, carbalkoxy and like substituent groups, and produced cross-linked polymers. Thus, the reaction completely fails in the preparation of any linear substituted para-xylylene polymer, or copolymer.

In addition, this high operating temperature, even with unsubstituted para-xylene was found to char the monomer, i.e., the p-xylylene diradical to such an extent that off-color, undesirable polymers resulted. With substituted polymers, charring becomes so severe that it cannot be tolerated.

Thus, the polymer of this process is of such non-uniform quality and is also so generally cross-linked and insoluble in low-boiling solvents as to limit its use even when of acceptable quality. Such polymers are generally only soluble with difficulty in certain few high boiling solvents.

Kaufman, Mark and Mesrobian (J. Pol. Sci. 13, 3 (1954)) investigating the polymer, concluded that the polymer was extensively cross-linked and was not the linear polymer that Szwarc presumed it to be. They also observed that the presence of oxygen substantially decreases the time needed for dissolution of the polymer in high boiling solvents by slowly breaking the cross-linking of the polymer. For example, the polymer dissolved in benzyl benzoate (at 323° C.) in 35.0 minutes in a nitrogen atmosphere as compared to only 2.4 minutes in an oxygen atmosphere. It is therefore concluded that the high temperature pyrolysis of Szwarc's process dehydrogenated the aromatic ring of the p-xylylene to such an extent that condensation cross-linking and/or chain branching between individual polymer molecules resulted. Subsequent thermal treatment in the presence of solvent and oxygen thus was able to significantly degrade the polymer or to accelerate the rupture of the cross-linking to make it soluble.

Further observations by other researchers in this field also concluded that the poly-p-xylylene made by high temperature pyrolysis are truly cross-linked Auspos et al., J. Polymer Science 1955, 15 pg. 9 and 15 set forth a number of observations of the poly-p-xylylenes which led them to conclude that the polymer was significantly cross-linked as well as being highly crystalline in nature. This combination of factors has been frequently attributed as imparting significant intractability of the polymer. Errede et al., Quarterly Reviews, the Chemical Society, London, 1958, vol. XII, No. 4, pages 301–320, concluded that from the evidence at hand, the polymer is cross-linked in addition to being crystalline and which contributes to its intractability, and the non-solubility of the polymer until the temperature of the solution approaches that of the crystalline melting point.

The most probable explanation of the cross-linking reaction is by radical addition at sites of hydrogen abstraction from the aromatic nuclei, this reaction being fostered by the high pyrolyzing temperatures employed.

The polymeric p-xylylenes and the Szwarc process thus are not true linear polymers as is desirable for most thermoplastic polymeric applications and the need for a suitable method for producing a truly linear, solvent-soluble substituted para-xylylene polymers of suitable color, free of cross-linking and in a respectable yield for commercial application remained to be found.

Attempts to prepare polymers by other techniques have also been attempted as exemplified by Schaefgen, Journal Polymer Science, vol. 15, pp. 203–219 (1955) wherein related compounds such as cyclic di-p-xylylene and linear di-p-xylylene were pyrolyzed in an attempt to secure the poly-p-xylylene free of cross-linking. Such efforts however lead only to the preparation of very low amounts, i.e., less than 5 percent, of highly fluorescent polymers. Such polymers have not only been found to be of inferior physical properties but also are highly unsaturated as to be essentially stilbene polymers and not linear saturated poly-p-xylylenes.

According to the present invention it has now been discovered that truly linear copolymers of p-xylylene diradicals are produced in nearly quantitative yield by heating at least one substituted cyclo di-p-xylylene having up to about six aromatic nuclear substituent groups to a temperature between about 450° and 700° C. for a time sufficient to cleave substantially all the di-p-xylylene into vaporous p-xylylene diradicals but insufficient to further degrade the said diradicals, and at a pressure such that the partial pressure of the vaporous p-xylylene diradicals is below 1.0 mm. Hg and preferably below about 0.75 mm. Hg, forming a vaporous mixture consisting essentially of at least two different vaporous p-xylylene diradicals each having the basic structure

and each containing no more than three aromatic substituent groups, and cooling the vaporous mixture of said diradicals to a temperature below 200° C. and below the ceiling condensation temperature of at least two of the different p-xylylene diradical species present in the vapors thereby simultaneously condensing and copolymerizing the diradicals. In this way a random p-xylylene copolymer is secured.

In this process, each of the several different p-xylylene diradicals may have differing nuclear substituents or have different numbers of substituent groups on each diradical.

The diradicals are prepared by the pyrolytic cleaving of at least one substituted cyclo di-p-xylylene having from one to six aromatic nuclear substituent groups. These cyclo di-p-xylylenes can be represented by the structure

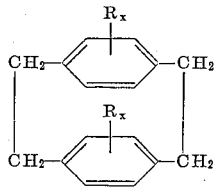

where R is a group which can normally be substituted on aromatic nuclei and $x$ is an integer from 0 to 3, inclusive. Pyrolytic cleaving of this cyclic dimer results in two separate reactive diradicals, each of which is represented by the structure

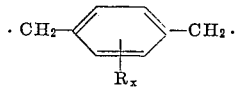

where either one or both of R and $x$ being the same or different. Thus it is within the scope of this invention to make copolymers from the differing radicals obtained from one, two or more substituted di-p-xylylenes. For instance, when there are an odd number of the same R substituent on the di-p-xylylene, two different diradicals will result from the pyrolysis of that di-p-xylylene. When there is an even number and all R groups are the same, only one diradical will result, and only homopolymers will result on condensation. Thus, when such is the case, two different di-p-xylylenes or a substituted di-p-xylylene having differing R groups or a different number of such groups should be used to obtain the mixture of different diradicals.

For example, four different p-xylylene diradicals can result from only two starting materials having the shown structure and each can be different. Thus, while one diradical may be the p-xylylene diradical, the other or others should be substituted diradicals where R is a different organic or inorganic group or where $x$ is a different integer. Thus it is clearly within the scope of this invention that the substituent groups be the same, but that there should be a different number of such groups on each diradical to make them different.

Hence, this technique can make copolymers of p-xylylene and substituted p-xylylene diradicals, copolymers of different substituted p-xylylene diradicals, as well as copolymers of different p-xylylene diradicals wherein the substituent groups are the same but each diradical containing a differing number of substituent groups.

It is also within the scope of this invention to make copolymers of two, three, four or even more different p-xylylene diradicals, all of which for the purposes described herein are termed "copolymers." For example, a copolymer containing four different p-xylylene units can result, if desired, from only two starting di-p-xylylenes. As for example, trichloro-di-p-xylylene and ethyl-di-p-xylylene yields four p-xylylene diradical species on pyrolysis, p-xylylene, ethyl-p-xylylene, chloro-p-xylylene, and di-chloro-p-xylylene. Cooling of the vaporous mixture to a temperature of about room temperature causes a copolymer to form having units of each of the diradical species.

The coupling of the reactive diradicals in the copolymerization in this invention involves very low activation energies, and the chain propagation shows little or no preference as to which diradical adds on. Since the substituent groups are quite far removed from the reaction site, steric and electronic effects are not important as they are in vinyl copolymerization. Thus, these copolymers are random copolymers containing essentially the same molar percentage of each of the different p-xylylene units as existed in the diradical form in the vapor phase, and the desired ratio of copolymerized units can be ascertained prior to polymerization by employing the same ratio of reactive diradicals in the vapor phase.

Inasmuch as the coupling of these reactive diradicals does not involve the aromatic ring and the nuclear substituents do not become involved in or affect the chain propagation, any copolymer of two or more different reactive diradicals can be prepared since the substituent groups function essentially as inert groups. Thus, the substituent group can be any organic or inorganic group which can normally be found, or substituted on an aromatic nuclei. As an illustration of such substituent groups are hydrocarbons, oxyhydrocarbons, thiohydrocarbons, hydroxyl, halogen, nitro, nitrile, amine, mercapto and like groups as is illustrated by such groups as methyl, ethyl, propyl, butyl, hexyl, alkenyls like vinyl, aryls for example phenyl, naphthyl, substituted phenyl such as halophenyl and alkylphenyl, as well as alkoxy groups like methoxy, ethoxy, propoxy, etc., hydroxyalkyl groups such as hydroxymethyl, hydroxyethyl and the like, carboxyl, carboxyalkyl such as carbomethoxy, carboethoxy, and the like, acyl groups such as acetyl, propionyl, butyryl and the like, as well as cyanoalkyl and similar organic radicals, as well as the above recited inorganic groups and halogens such as chlorine, bromine, iodine, and fluorine. However such listing is not exhaustive of substituent groups but is only illustrative of the broad scope of this invention.

Particularly preferred of the substituted groups are all those simple hydrocarbon groups such as the lower alkyls as methyl, ethyl, propyl, butyl, hexyl, lower aryl hydrocarbons such as phenyl, alkylated phenyl, naphthyl, alicyclic groups such as cyclohexyl, aralkyl groups such as benzyl and like hydrocarbon substituents having less than 10 carbon atoms, and the halogen groups, particularly chlorine and bromine. Particularly desirable copolymers are prepared using molar ratios of alkyl-p-xylylenes and halogenated-p-xylylene diradicals from 10 to 90 percent, and particularly the ethyl-, propyl- or butyl-p-xylylene copolymerized with chloro- or bromo-p-xylylene.

The substituted di-p-xylylenes from which these reactive diradicals are prepared, can be prepared from the cyclic dimer, di-p-xylylene, by appropriate treatment, such as halogenation, acetylation, cyanolation, alkylation, and/or oxidation and reduction and like methods of introduction of such substituent groups into aromatic nuclei. Inasmuch as the cyclic dimer is a very stable product up to temperatures of about 400° C., elevated temperature reactions can also be employed for the preparation of various substituted materials. Sample preparation of a number of substituted di-p-xylylenes are shown in the following examples.

In this process, the mixture of the reactive diradicals are prepared by pyrolyzing one or more of the di-para-xylylenes at a temperature less than about 700° C., and preferably at a temperature between about 550° C. to about 600° C. At such temperatures, essentially quantitative yields of the reactive diradical are secured. Pyrolysis of the starting di-p-xylylene begins at about 450° C. regardless of the pressure employed. Operation in the range of 450°–550° C. serves only to increase time of reaction and lessen the yield of polymer secured. At temperatures above about 700° C., cleavage of the substituent group can occur, resulting in tri- or polyfunctional species causing cross-linking or highly branched polymers.

Pyrolysis temperature is essentially independent of the system operating pressure. It is however preferred that reduced or subatmospheric system pressures be employed. For most operations, a p-xylylene partial pressure below 1.0 mm. Hg and a system pressure within the range of 0.001 to 10 mm. Hg is most practical. However, if desired, greater pressures can be employed by using inert vaporous diluents such as nitrogen, argon, carbon dioxide, steam and the like which can either vary the optimum temperature of operation or to change the total effective pressure in the system. In fact essentially quantitative yields of clear, tough linear poly-p-xylylene has been secured at system pressures up to atmospheric as long as the p-xylylene diradical partial pressure is kept below 1.0 mm. pressure.

Polymer quality is dependent on diradical partial pressure in the condensation zone. Deposition at or above 1.0 mm. partial pressure has been found to yield yellow, highly fluoroescent polymers with impaired physical properties containing stilbene moieties and/or substantial cross-linking. As the partial pressure is reduced below 1.0 mm., polymer quality as measured by color, transparency and fluorescence is remarkably improved. At a pressure of 0.75 mm. the polymer is free of fluorescence and acceptable in quality although whereas at a pressure of 0.5 mm. or less the quality is excellent with no color or fluorescence, and is strong and flexible.

Because of such pressure sensitivity, common U-tube mercury manometers, which are virtually impossible to read with accuracy below 1.0 mm., are recommended only for indicating system pressure. Even though the diradical is a condensible gas, thermocouple gauges for measuring the partial pressures can be used and are recommended, if heated to prevent deposition of polymer on the filaments. Preferably, though not always necessary, the heated thermocouple gauge can be calibrated against a McCleod gauge to relate the true partial pressure of the p-xylylene diradicals.

These reactive diradicals possess such a low activation energy that copolymerization occurs simutlaneously with condensation upon cooling of the vaporous mixture of reactive diradicals to the condensation temperature of at least two diradical species. For each diradical species there is a definite ceiling condensation temperature above which the diradical will not condense and polymerize. All observed ceilings have been below 200° C. but vary to some degree upon the system pressure. For example, at 0.5 mm. Hg, the following condensation and polymerization ceilings are observed for the following diradicals.

| | Degrees C. |
|---|---|
| p-Xylylene | 25–30 |
| Chloro-p-xylylene | 70–80 |
| Ethyl-p-xylylene | 70–80 |
| n-Butyl-p-xylylene | 130–140 |
| Bromo-p-xylylene | 130–140 |
| Acetyl-p-xylylene | 130–140 |
| Carbomethoxy-p-xylylene | 130–140 |
| Dichloro-p-xylylene | 130–140 |

Thus, by this process, copolymers are made by maintaining the initial condensation and polymerization zone at a temperature below the ceiling condensation temperature of at least two diradicals, that is below the condensation temperature of the lowest condensing diradical desired in the copolymer. This is considered "copolymerizing conditions," since at least two of the diradicals will condense and copolymerize in a random copolymer at such temperature. Where several diradicals in the mixture have essentially similar vapor pressure and condensation characteristics, as for example, bromo-p-xylylene and acetyl-p-xylylene, the copolymerization is conducted at the condensation temperature of either as they are essentially the same.

This feature provides a very desirable advantage in this process in that each of the diradicals present in the vaporous mixture does not have to be polymerized in the same polymer produced in this process. Thus, it is possible by careful control of the condensation temperature to exclude, if desired, any lower boiling diradicals. For example, in the case of the pyrolysis of ethyl-di-p-xylylene and dichloro-di-p-xylylene, three reactive diradicals are produced; p-xylylene, ethyl-p-xylylene and chloro-p-xylylene in a respective molar ratio of 1:1:2. Condensation of the mixture at about 70–80° C. will yield at 2:1 copolymer of chloro-p-xylylene and ethyl-p-xylylene with the p-xylylene diradicals passing through the polymerization zone as uncondensed vapors. However, by lowering the condensation temperature to 25–30° C., a 2:1:1 copolymer of chloro-p-xylylene, ethyl-p-xylylene and p-xylylene will result. This, of course, can be accomplished with any of the mixtures of diradicals within this invention.

In the same respect, the uncondensed vapors of the diradicals passing through the first polymerization zone can be homopolymerized, or if there are two unpolymerized diradicals, they can be copolymerized in a second polymerization zone. Thus, in this process, it is possible to produce copolymers of any number of different diradicals, or two or more separate copolymers of selected substituents, in one or more polymerization zones which can easily be predicted and controlled by maintaining predetermined copolymerization conditions in the polymerization zone or zones.

The copolymers are readily recovered from the condensation polymerization zone by any convenient means, depending on the particular zone employed. Where a cold surface, such as a condenser, is employed as the polymerization zone the polymer can be removed from the wall of the polymerization zone by mechanically stripping or dissolving it off with a solvent. Condensation of the mixture of diradicals in a water spray or under the surface of an aqueous medium causes the polymer to assume particulate form which can be separated by filtration and drying by conventional means prior to fabrication. It is not to be implied that the polymers of this invention have to be removed or recovered from the depositing surface since the most practical of all applications is to have the surface or substrate to be coated and protected within or as a part of the polymerization zone. Small articles can be protected or encapsulated with these polymers or planar or irregular substrates of any sort can be coated, with or without masking, for securing the insulative and protective properties of the poly-p-xylylenes of this invention. Deposition of the polymer on continuously moving surfaces of paper, metal foils, fabrics and the like can readily be accomplished within the deposition zone by appropriate design.

In all of the appended examples, partial pressure of the p-xylylene diradicals was below 0.75 mm. and in most instances below 0.5 mm. Hg pressure. These examples are illustrative of this invention and should not be interpreted as a limitation or restriction thereof. Unless otherwise noted, all amounts are in parts by weight.

EXAMPLE I

*Copolymerization of chloro-p-xylylene and dichloro-p-xylylene*

Trichloro-di-p-xylylene was the starting material for this copolymer and was prepared as follows.

A mixture of four grams of di-p-xylylene, 300 ml. of carbon tetrachloride and 0.1 gram of iron powder was placed in a one liter, 3 neck flask equipped with stirrer, addition funnel and reflux condenser. A mixture of 4.0 grams of chlorine in 100 ml. of carbon tetrachloride was added from the addition funnel to the stirred mixture over a 60 minute period. An immediate reaction occurred, as evidenced by evolution of hydrogen chloride and by the rapid disappearance of the insoluble di-p-xylylene. The reactants were stirred for two hours at room temperature. The solution was filtered to remove the iron powder and the solvent was removed by evaporation at room temperature. The purified product melted at 150° C. to 160° C. and analyzed at 34.0 percent chlorine (theoretical content 34.3 percent). The yield amounted to 77 percent of a cyclic dimer having the formula:

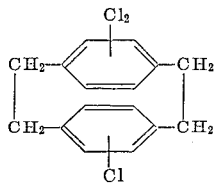

Two grams of the cyclic dimer was pyrolyzed by vaporizing the dimer in a distillation zone maintained at 150° C. at 1 mm. system pressure. The distillation zone was connected to a 17 mm. Pyrex glass tube having an 18 inch pyrolysis zone maintained at 570°–580° C., a 15 inch polymerization zone maintained at 80°–90° C. and a second 15 inch polymerization zone maintained at room temperature (25°–30° C.). The entire system was maintained at a system pressure of 1 mm. Hg by a vacuum pump connected to the outlet of the second polymerization zone.

The pyrolysis of the trichloro-p-xylylene yielded the two diradicals, monochloro-p-xylylene and dichloro-p-xylylene in equimolar amounts which were copolymerized in the first polymerization zone. The copolymer was recovered by mechanically stripping the copolymer film from the walls of the first polymerization zone. There was no polymer formation on the walls of the second zone indicating that the two reactive diradicals had all polymerized at the 80°–90° C. temperature. The weight of crude copolymer was 2.0 grams. This was extracted with carbon tetrachloride to remove any condensed unpolymerized cyclic dimer. The extracted polymer weight 1.95 grams, corresponding to a yield of 97 percent by weight of the starting dimer.

The copolymer was composed of equimolar amounts of monochloro-p-xylylene and dichloro-p-xylylene units theoretically represented by the empirical formula:

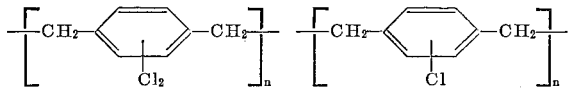

It has a melting point of about 280° C. and was a tough self-extinguishing, clear strong film. Solvent casting techniques from a 5–10 percent solution of the polymer in alpha chloronaphthalene yields clear, tough, strong films.

EXAMPLE II

*Copolymerization of chloro-p-xylylene and ethyl-p-xylylene*

Dichloro-di-p-xylylene and monoethyl-di-p-xylylene were employed as the starting materials for this copolymerization.

The starting material, di-chloro-di-p-xylylene, was prepared as described in Example III. The monoethyl-di-p-xylylene was prepared by a reduction reaction involving a reaction between 3.8 grams of acetyl-di-p-xylylene, 30 ml. of glacial acetic acid, 30 ml. of concentrated hydrochloric acid and 12 gms. of amalgamated zinc. The mixture was refluxed for one hour after which 30 ml. of glacial acetic acid and 30 ml. of concentrated hydrochloric acid were added. The solution turned red and upon standing became colorless and subsequently an oil separated. Refluxing was conducted for a total of five hours after which the contents were cooled, diluted with 200 ml. water and extracted with 150 cc. of benzene. The benzene extract was washed with water, concentrated and dried. The product was purified by vacuum distillation. It amounted to 2.3 grams (65% yield) of 2-ethyl-di-p-xylylene having a melting point of 100° C.–108° C. and a boiling point of 160°–180° C. (at 0.3 mm. Hg pressure). It has the structural formula:

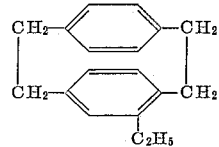

The copolymerization of chloro-p-xylylene and ethyl-p-xylylene was conducted by pryolysis of a mixture of dichloro-di-p-xylylene and ethyl-di-p-xylylene in substantially the manner as described in Example I. Pyrolysis of the vaporized dimer yields a mixture of three diradicals, namely, chloro-p-xylylene, 2-ethyl-p-xylylene, and p-xylylene. The chloro-p-xylylene and ethyl-p-xylylene diradicals condensed and copolymerized in the initial polymerization zone maintained at 90° C. while the p-xylylene diradicals passed through this zone and condensed and polymerized in the second polymerization zone maintained at 30° C.

In this example a mixture of 1.35 g. of dichloro-di-p-xylylene and 0.27 g. of ethyl-di-p-xylylene was vaporized by distillation and passed through the 600° C. pyrolysis zone over a 15 minute period to give a molar ratio of chloro-p-xylylene, ethyl-p-xylylene and p-xylylene diradicals of 9:1:1. The pressure of the system was 0.3 mm. A total of 1.5 g. of ether-insoluble copolymer was obtained from the 90° C. polymerization zone. It is evident that a copolymer was obtained since this quantity is greater than the weight charge of dichloro-di-p-xylylene. The charge and analysis corresponds to a 90/10 chloro-p-xylylene/ethyl-p-xylylene copolymer. The copolymer was substantially more flexible, extensible, and tougher than polychloro-p-xylylene. The copolymer exhibited an elongation at break of 190 percent while polychloro-p-xylylene prepared in an identical fashion exhibited an elongation at break of 26 percent. Other physical properties of this copolymer are as follows:

Tensile strength, p.s.i. _____ 6,400
Tensile modulus, p.s.i. _____ 263,000
Elongation at break, percent _____ 190
Crystalline melting point, ° C. _____ 250
Glass transition temp., ° C. _____ 65

EXAMPLE III

*Copolymerization of chloro-p-xylylene and butyl-p-xylylene*

The starting materials for this copolymerization, dichloro-di-p-xylylene and mono-butyl-di-p-xylylene were prepared as follows.

(a) Dichloro-di-p-xylylene was prepared by mixing 12 grams of di-p-xylylene with 350 ml. of carbon tetrachloride and 0.1 gram of iron powder, was placed in a one liter, 3 neck flask equipped with stirrer, drying tube and addition funnel. The flask was cooled in a water bath. A solution of 8.4 g. of chlorine and 150 ml. of carbon tetrachloride were added from the addition funnel to the stirred suspension over a 60 minute period. The reaction was completed at the end of one hour, as evidenced by the disappearance of the characteristic chlorine color in the solution. The iron was removed by filtration, and carbon tetrachloride by distillation. The product was purified by vacuum distillation, and amounted to 13 grams or 83 percent yield. This material melting at 160° C. to 170° C. gave an analysis of 25.0 percent chlorine, matching the theoretical value of 25.0 percent. Its formula is:

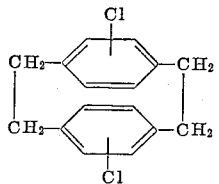

(b) The butyl-di-p-xylylene was prepared by the reduction of butyryl di-p-xylylene which itself was prepared as follows.

In a 500 ml. three-neck flask equipped with stirrer, calcium chloride tube and stopper was placed 9.5 g. of aluminum chloride, 125 ml. of s-tetrachloroethane, and 8.5 g. of n-butyryl chloride. The mixture was cooled to −30° C. and 7.5 g. of di-p-xylylene added. The solution was stirred at −15 to −20° C. for twenty minutes, cooled to −30° C., and 50 ml. of 1 N hydrochloric acid added. The solution was allowed to warm up to room temperature. The mixture was transferred to a separatory funnel, 100 ml. of water added and the aqueous layer containing inorganic salts was extracted from the organic layer. The organic layer was separated, washed with 150 ml. of 3% sodium bicarbonate solution, 100 ml. of water and dried. The solvent was removed by distillation and the product purified by vacuum distillation. A total of 6.7 grams (66% yield), of 2-butyryl-di-p-xylylene having a boiling point of 160–170° C. at 0.15 mm. and a melting point of 88–93° C. was obtained. The compound exhibited characteristic infra-red spectrum for 2-butyryl-di-p-xylylene and which was comparable to the spectrum of 2-acetyl-di-p-xylylene. The reaction can be illustrated as follows.

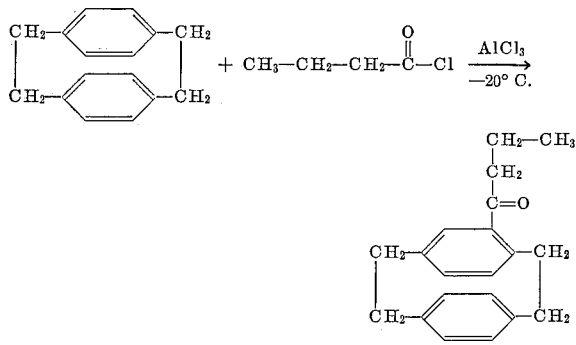

In a 250 ml. flask was placed 10 g. of amalgamated zinc, 125 ml. of glacial acetic acid, 15 ml. of concentrated hydrochloric acid, and 5 gm. of 2-butyl-di-p-xylylene. The solution was heated to reflux for two days. The solution was intermittently resaturated with anhydrous hydrogen chloride. At the end of this period the hot solution was transferred to a flask containing a new 10 gram portion of amalgamated zinc. The reduction process was repeated for an additional 24 hours. The mixture was transferred to a separatory funnel and the product extracted into benzene. The benzene layer was washed and dried. The benzene was removed by atmospheric distillation and the product purified by vacuum distillation. A total of 1.16 gms. of n-butyl-di-p-xylylene having a boiling point of 150° C. at 0.1 mm. and a melting point of 65–68° C. was obtained. The reaction being represented by the following scheme.

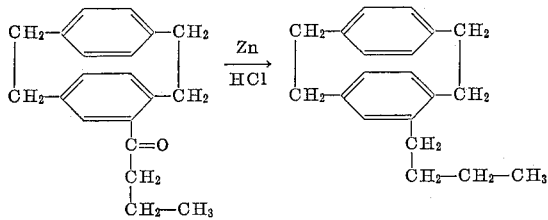

(c) A mixture of the dichloro-di-p-xylylene and mono-n-butyl-di-p-xylylene prepared as above in amounts indicated in the table below was pyrolyzed in the equipment described in Example I. The distillation zone was maintained at 100°–125° C. to vaporize the dimers and the pyrolysis zone was maintained at a temperature of 580°–600° C. at 0.7 mm. Hg pressure. The pyrolysis zone cleaved the dimers into three reactive diradicals, chloro-p-xylylene, n-butyl-p-xylylene and p-xylylene in a weight molar ratio as indicated. The initial polymerization zone was maintained at 90°–100° C. and the second zone at room temperature (25°–30° C.). At the temperature of the initial polymerization zone, both the chloro-p-xylylene and the n-butyl-p-xylylene condensed and copolymerized in the first part of this zone. The p-xylylene diradical, condensing only at lower temperature, passed through this first polymerization zone and homopolymerized in the second room temperature polymerization zone. The copolymer film was stripped from the surface of the first zone extracted with successive portions of carbon tetrachloride. The weights of recovered copolymer is noted in the following table.

|  | Run | | | |
|---|---|---|---|---|
|  | A | B | C | D |
| Dichloro-di-p-xylylene (gm.) | 0.8 | 0.8 | 1.6 | 1.0 |
| Butyl-di-p-xylylene (gm.) | 0.3 | 0.15 | 0.15 | 0.0 |
| Weight of polymer (gm.) | 0.55 | 0.70 | 1.35 | 0.85 |
| Theoretical percent of Butyl [1] | 18.5 | 10 | 5.5 | 0 |
| Percent chlorine [2] | 18.9 | 22.5 | 22.8 | 25.8 |
| Calculated percent butyl [3] | 25 | 12 | 11 | 0 |
| Polymer melting point (° C.) | 210–215 | 220–225 | 230–235 | 270–280 |
| Elongation of sample at Break, percent |  | 100 | 190 |  |

[1] Based on monomer charge.
[2] As determined by quantitative elemental analysis.
[3] Based on chlorine analysis of copolymer.

Each of the copolymers was completely dissolved by heating in γ-chloro-napthalene. The solution temperature reported below is the temperature required to dissolve the copolymer. The gel temperature reported below is the temperature at which the solution of the copolymer in 2-chloro-napthalene set to a gel on gradual cooling.

|  | Run | | | |
|---|---|---|---|---|
|  | A | B | C | D |
| Solution Temp. (° C.) | 170 | 185 | 210 | 215 |
| Gel Temp. (° C.) | 65 | 68 | 71 | 105 |

Para-xylylene copolymers containing about 5, 10 and 20 percent by weight of n-butyl-p-xylylene in the copolymer (balance being chloro-p-xylylene) were prepared in this manner. The crystalline melting points of the copolymers were in the range of 220–250° C. compared with 280° C. for pure poly-chloro-p-xylylene. The solubility of the copolymers in chloro-napthalene and s-tetrachloroethane was much greater than that of poly-chloro-p-xylylene. Chlorine analyses were also in the range calculated for the copolymers. All the observations show that copolymers were obtained rather than a mixture of the two homopolymers. The copolymers proved to be quite extensible at room temperature. In general, they were more flexible, and had a softer feel than poly-chloro-p-xylylene. The physical properties of the run B copolymer is summarized as follows.

Tensile strength, p.s.i. _____ 5100
Tensile modulus, p.s.i. _____ 91,000
Elongation at break, percent _____ 100
Glass transition temp., ° C. _____ 10
Crystalline melting point, ° C. _____ 220–225

The copolymer from run A was entirely soluble in tetrachloroethane while poly-chloro-p-xylylene is insoluble in this solvent. This difference in solubility characteristics provides additional proof for the formation of the copolymer.

EXAMPLE IV

*Copolymerization of chloro-p-xylylene and acetyl-p-xylylene*

Dichloro-di-p-xylylene and acetyl-di-p-xylylene were empolyed as the starting material for this copolymerization. The dichloro-di-p-xylylene was prepared as described in Example III. The acetyl-di-p-xylylene was prepared by the low temperature (—20° C.) Friedel-Crafts acetylation of di-p-xylylene with acetyl chloride as follows:

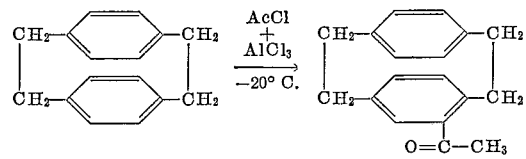

The acetyl-di-p-xylylene was recovered in a yield of 63% melting at 108–111° C.

The copolymerization was carried out by the pyrolysis of a mixture of 0.34 gram of the acetyl-di-p-xylylene and 1.8 grams of the dichloro-di-p-xylylene as described in Example I to yield a transparent, tough, copolymer of 10 percent acetyl-p-xylylene and 90 percent chloro-p-xylylene. Solubility determination using γ-chloronaphthalene solvent showed it to be a true copolymer rather than a mixture of homopolymers.

EXAMPLE V

*Copolymers of p-xylylene and substituted p-xylylene*

Copolymers of p-xylylene and the chloro-, bromo-n-butyl-, ethyl-, butyryl-, carbomethoxy- and acetyl-substituted p-xylylenes are also prepared in a manner as described in Example I except that both the first and second reaction zones are maintained at a temperature below the condensation and polymerization temperature of p-xylylene diradical, i.e. at 20°–30° C.

A mixture of the diradicals produced by pyrolyzing a vaporous mixture of di-p-xylylene and the appropriately substituted di-p-xylylene fed through a pyrolysis zone maintained at 580°–600° C. and to the polymerization zone maintained at 20°–30° C. The copolymers are recovered as described in Example I and exhibit lower melting points than poly-p-xylylene. They form tough, clear films which can be easily stripped from the polymerization zone.

EXAMPLE VI

*Copolymers of dichloro-p-xylylene and trichloro-p-xylylene*

Employing the same techniques as described in Example I, pentachloro-di-p-xylylene was prepared by the chlorination of di-p-xylylene. The yield was 74 percent of the compound:

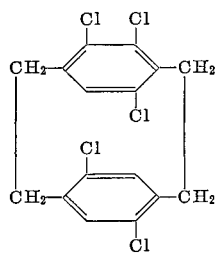

The pentachloro-di-p-xylylene was vaporized and passed through the pyrolysis zone maintained at 570° C. at 0.5 mm. Hg pressure and thence into the first polymerization zone maintained at 130° C. At this temperature both the dichloro-p-xylylene and the trichloro-p-xylylene diradicals formed in the pyrolysis zone condensed and copolymerized in a 1:1 ratio to form a copolymer composed of alternating di- and tri-chlorinated nuclei. The polymer had a melting point of 300° C. and was a tough, self-extinguishing polymer that readily made films from a γ-chloronaphthalene solvent solution.

EXAMPLE VII

*Copolymers of carbomethoxy-p-xylylene and p-xylylene*

Carbomethoxy-di-p-xylylene was prepared from the carboxy-di-p-xylylene having a melting point of 221–223° C. by the oxidation of acetyl-di-p-xylylene with KOBr at 0° C. This products had the structure

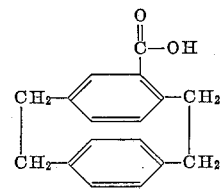

and was esterified with methanol according to the following procedure.

In a 100 ml. one neck flask was placed 1.3 g. of carboxy-di-p-xylylene, 40 ml. of methanol, and 2 ml. of concentrated sulfuric acid. The contents were heated to reflux for five hours and the solution concentrated to 20 ml. by distillation. On cooling a product crystallized from solution and was isolated by filtration. A total of 1.0 g. of the crude ester, melting point 135–145° C. was obtained. The crude product was dissolved in 100 ml. of chloroform and the chloroform solution washed with 100 ml. of 2% sodium hydroxide solution to remove any unesterified acid. The chloroform solution was dried over magulsium sulfate and the solvent removed by evaporation. A total of 0.8 (60% yield) of 2-carbomethoxy-di-p-xylylene, melting point 135°–138° C. was obtained in this fashion having the structure

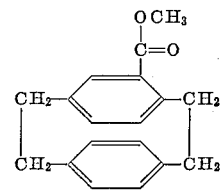

This compound when passed through a pyrolysis zone maintained at 580° C. and the pyrolysis vapors consisting of p-xylylene diradicals and carbomethoxy-di-p-xylylene, polymerized on the room temperature polymerization zone having a 1:1 ratio of units of the two diradicals. The polymer had a crystalline melting point of 300° C., and was a tough homogeneous film.

EXAMPLE VIII

In a 250 ml. three-neck flask equipped with stirrer, calcium chloride tube, and stopper was placed 200 ml. of s-tetrachloroethane, 10.8 g. of anhydrous aluminum chloride, and 13 g. of benzoyl chloride. Stirring was commenced and the flask immersed in a Dry Ice acetone bath at —20 to —25° C. 10.8 g. of di-p-xylylene was added in one portion and the mixture stirred at —20° to —25° C. for one hour. The catalyst was then decomposed by addition of 100 ml. of 1 N hydrochloric acid. The organic layer was separated and washed successively with 100 ml. of water, 100 ml. of 5% sodium bicarbonate solution, and 100 ml. of water. The organic layer was dried and the solvent removed by vacuum distillation. The product was distilled through a short path column and had a boiling point of 200–215° C. at 0.3 mm. The product was triturated with ether, and the ether solution filtered to recover a small amount of unreacted di-p-xylylene. On evaporation of the ether a total of 12.08 g. (78% yield) of benzoyl-di-p-xylylene, M.P. 118–120° C. was obtained. After recrystallization from methanol the material had a melting point of 122–123° C. The reaction can be represented by the following scheme

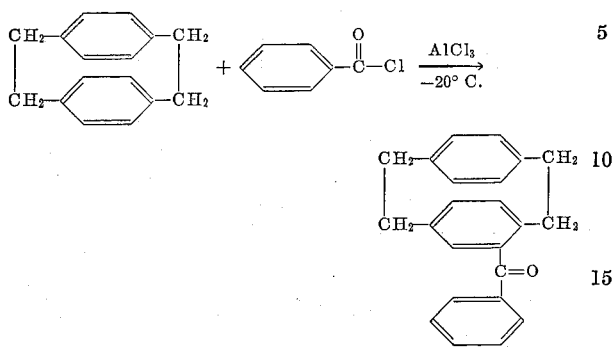

Pyrolysis of the 2-benzoyl-di-p-xylylene at a temperature of 550°–600° C. as described yields the diradicals 2-benzoyl-p-xylylene and p-xylene which, on a room temperature cooled surface, condense into the copolymer of these diradicals according to the scheme

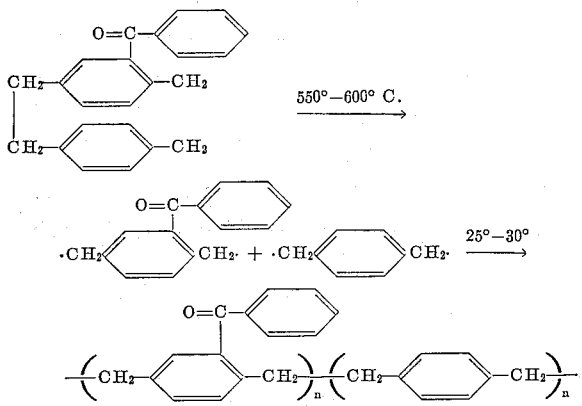

However if desired the 2-benzoyl di-p-xylylene can itself be employed as an intermediate by reduction to 2-benzyl-di-p-xylylene according to the following scheme and procedure.

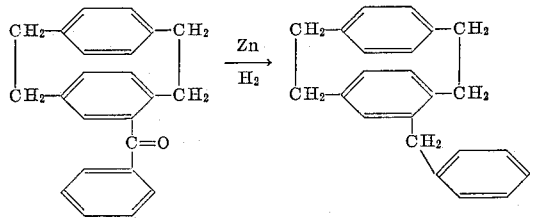

In a 250 ml. flask was placed 10 g. of amalgamated zinc, 100 ml. of glacial acetic acid, 2.5 g. of benzoyl-di-p-xylylene, and 15 ml. of concentrated hydrochloric acid. The solution was heated to reflux and resaturated with anhydrous hydrogen chloride at the end of every hour for a total of six hours. The mixture was then heated to reflux overnight. The liquid products were transferred into a separatory funnel and the organic products extracted into 100 ml. of benzene. The benzene layer was separated, washed and dried. The benzene was removed by atmospheric distillation and the product purified by vacuum distillation. The product had a boiling point of 100–200° C. at 0.3 mm. and was recrystallized from aqueous ethanol. A total of 0.55 g. of pure 2-benzyl-di-p-xylylene, melting point 135–136° C. was obtained.

Pyrolysis of the 2-benzyl di-p-xylylene yields the diradicals, 2-benzyl-p-xylylene and p-xylene according to the following scheme.

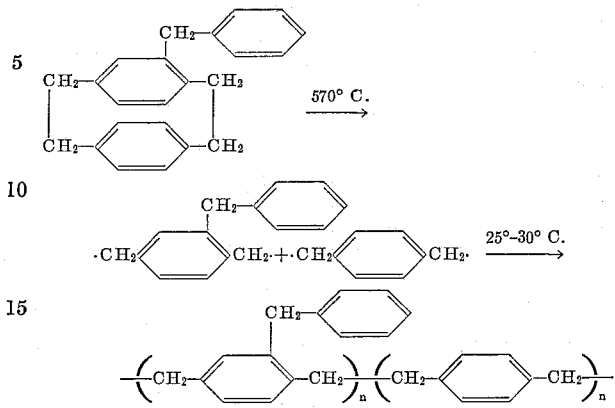

and copolymerize in the air cooled section of the tube to yield the copolymer of the two diradicals in a 1:1 molar ratio.

It has been found in this process that the molecular weight of the copolymers can be controlled, as for instance by the use of free radical chain transfer agent. While actual molecular weights of these copolymers are difficult to estimate and almost impossible to determine with certainty, reduced viscosity of the polymer determined on a 0.2 gram sample in a suitable solvent for the polymer has been found to be an excellent way of characterizing the molecular weight of the polymers.

EXAMPLE IX

In the same manner as Example III a 90/10 chloro/butyl p-xylylene copolymer was prepared employing dodecane thiol as a chain transfer agent in controlling the molecular weight of the copolymer. The data is summarized in the following table:

| Copolymer | Wt. Percent chain transfer agent | R.V.* of product |
|---|---|---|
| 90/10 chloro/butyl | 0 | 2.2 |
| Do | 7 | 1.02 |
| Do | 14 | 0.85 |

*Reduced viscosity measured at 25° C. in α-chloronaphthalene at 0.2 percent concentration.

It is understood that other typical free radical chain transfer agents can be employed with similar results in the practice of this invention. Among such typical agents which bear special mention are phenols, halogenated hydrocarbons, aliphatic ketones, aliphatic and aromatic mercaptans, triphenyl methanes, trans-stilbene and the like. Particularly preferred are the aliphatic mercaptans such as dodecane thiol, β-naphthyl mercaptan, triphenyl methane and trans-stilbene. By techniques, some of which are illustrated above, it is possible to insert on the aromatic nuclei of the starting di-p-xylylene any group which can normally be substituted on aromatic nuclei. Polyalkyl substituted di-p-xylyenes are prepared for instance by repetitive acylation and reduction reactions or by direct alkylation as more fully set forth in my United States Patent 3,117,168 entitled "Alkylated Di-p-xylylenes" and poly-halogenated di-p-xylylenes are prepared as illustrated above and more specifically covered in my United States Patent 3,221,068 entitled "Halogenated Di-p-xylylenes."

Other substituents normally substitutable on an aromatic nuclei can be prepared by other reactions similar to those wherein aromatic substitution occurs. For instance nitro-di-p-xylylene is prepared by the method described by Cram, et al., J. Am. Chem. Soc., vol 77, No. 236,289 (1955) by dissolving di-p-xylylene in boiling acetic acid which is then nitrated at 70° C. with fuming nitric acid with constant agitation. After purification the nitro-di-p-xylylene had a melting point of 155.5° C.–156.5° C. The nitro substituted di-p-xylylene is readily pyrolyzed as hereinabove described and condensed into a copolymer of p-xylylene and 2-nitro p-xylylene.

However, by using the nitro di-p-xylylene as a starting material, the amino-di-p-xylylene can be prepared by reducing the nitro group with hydrogen over a platinum oxide catalyst in a solvent such as methanol. The amino-di-p-xylylene has a melting point of about 239°–241° C. and also can be pyrolyzed into two reactive diradicals which condense at room temperature into a copolymer of p-xylylene and amino-di-p-xylylene.

Further the acetamido-di-p-xylylene can be prepared from the amino-di-p-xylylene by use of acetic acid or acetic anhydride. The acetamido-di-p-xylylene has a melting point of 208°–210° C. and can be pyrolyzed in the same manner as set forth above into a copolymer.

By the same techniques as illustrated in the above examples, copolymers of any mixture of two or more p-xylylene diradicals can be prepared by cooling the diradicals to a temperature below the ceiling condensation temperature of the lowest boiling diradical desired in the copolymer.

The polymers prepared by this process are truly linear products free of cross-linking between chains inasmuch as at the low temperature of pyrolysis, all substituent groups are stable. The polymer can have reduced viscosities from 0.3 to as high as 6 measured as a 0.2 gram sample of the copolymer in γ-chloronaphthalene. For most molding and extrusion applications, reduced viscosities from about 0.5 to 1.0 are most desired.

The copolymers described herein generally are characteristically tougher than the homopolymeric p-xylylenes with only few exceptions, but are nevertheless highly crystalline and have sharp melting points. The high degree of crystallinity is an excellent indication of the lack of cross-linking and truly linear nature of these products. Complete solubility of these copolymers in such solvents as α-chloronaphthalene and other notable organic solvents without molecular degradation also is a significant characteristic of these linear copolymers. It is known for instance that as slight a degree of cross-linking as 0.1 percent divinylbenzene imparts to polystyrene renders the cross-linked polystyrene completely insoluble in normal solvents for linear polystyrene.

As shown hereinbefore, the crystalline melting point of these copolymers can be tailored to any desired temperature, depending upon the number and character of the substituent groups. Thus with such control, these copolymers can be employed for innumerable possible applications such as for fibers, films, molding an extrusion, solvent casting and coating applications.

What is claimed is:

1. A method for the preparation of linear copolymers of p-xylylenes comprising the steps of heating at least one substituted cyclo di-p-xylylene having up to about six aromatic nuclear substituent groups selected from the class consisting of hydrocarbon, oxyhydrocarbon, thiohydrocarbon, hydroxyl, halogen, nitro, nitrile, amine, and mercapto groups to a temperature between about 450° and 700° C. for a time sufficient to cleave substantially all the di-p-xylylene into vaporous p-xylylene diradicals but insufficient to further degrade the said diradicals, and at a pressure such that the partial pressure of the vaporous p-xylylene diradicals is below about 0.75 mm. Hg and forming a vaporous mixture consisting essentially of at least two different vaporous p-xylylene diradicals each having the basic structure

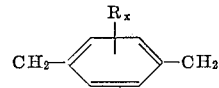

wherein R is as identified above and $x$ is an integer from 0 to 3, inclusive, and cooling the vaporous mixture of said diradicals to a temperature below 200° C. and below the ceiling condensation temperature of at least two of the different p-xylylene diradicals thereby condensing said diradicals and forming a random linear copolymer of p-xylylenes.

2. The method as defined in claim 1 wherein the pyrolysis is conducted at a temperature between 550° to 600° C.

3. The method as defined in claim 1 wherein the pyrolysis is conducted at a system pressure of between 0.0001 and 10 mm. Hg pressure.

4. The method as defined in claim 1 wherein an inert vaporous diluent is employed in the pyrolysis.

5. The method defined in claim 1 wherein the partial pressure of the p-xylylene diradicals is maintained below about 0.5 mm. Hg pressure.

6. The method defined in claim 1 wherein the condensation is conducted in the presence of a free radical chain transfer agent.

7. The method defined in claim 1 wherein more than two different diradicals are present and at least one diradical is not condensed in the first cooling and condensation zone and passes through said zone in the vaporous state.

8. The method defined in claim 1 wherein the diradical vapors are cooled and condensed on a cool substrate surface thereby coating said substrate surface with the p-xylylene copolymer.

References Cited by the Applicant
UNITED STATES PATENTS

| | | |
|---|---|---|
| 2,712,532 | 7/1955 | Szwarc et al. |
| 2,719,131 | 9/1955 | Hall. |
| 2,769,786 | 11/1956 | Szwarc et al. |
| 2,914,489 | 11/1959 | Hall. |

FOREIGN PATENTS

| | | |
|---|---|---|
| 673,651 | 6/1952 | Great Britain. |

OTHER REFERENCES

Brown et al.: Nature, vol. 164, pages 915–916 (1949).

Cram et al.: Journal American Chemical Society, vol. 73, pages 5691–5704 (1951).

Cram et al.: Journal American Chemical Society, vol. 77, pages 6289–6294 (1955).

Schaefgen: Journal Polymer Science, vol. 15, pages 203, 219 (1955).

Auspos et al.: Journal Polymer Science, vol. 15, pages 9–17 (1955).

Auspos et al.: Journal Polymer Science, vol. 15, pages 19–29 (1955).

Zimm et al.: Journal Polymer Science, vol. 9, pages 476–8 (1953).

SAMUEL H. BLECH, *Primary Examiner.*